(12) United States Patent
Morikawa et al.

(10) Patent No.: US 6,972,501 B2
(45) Date of Patent: Dec. 6, 2005

(54) CIRCUIT STRUCTURE OF ELECTRIC POWER STEERING DEVICE

(75) Inventors: Kenji Morikawa, Hekinan (JP);
Hideyuki Hayakawa, Nishio (JP);
Tetsuo Imamura, Toyoake (JP)

(73) Assignee: Denso Corporation, Kariya (JP)

( * ) Notice: Subject to any disclaimer, the term of this patent is extended or adjusted under 35 U.S.C. 154(b) by 26 days.

(21) Appl. No.: 10/630,704

(22) Filed: Jul. 31, 2003

(65) Prior Publication Data

US 2004/0028531 A1  Feb. 12, 2004

(30) Foreign Application Priority Data

| Aug. 7, 2002 | (JP) | ............................. 2002-230575 |
| May 20, 2003 | (JP) | ............................. 2003-142307 |

(51) Int. Cl.⁷ ............................................ H02K 11/00
(52) U.S. Cl. ..................................... 310/71; 310/68 R
(58) Field of Search .............................. 310/71, 68 R, 310/DIG. 6

(56) References Cited

U.S. PATENT DOCUMENTS 5,844,386 A * 12/1998 Matsuoka et al. .......... 318/293
6,577,030 B2 * 6/2003 Tominaga et al. ......... 310/68 B
6,617,719 B2 * 9/2003 Sunaga et al. ................ 310/64
6,707,185 B2 * 3/2004 Hemmi et al. ................ 310/71

FOREIGN PATENT DOCUMENTS

| JP | 4-25458   | 2/1992 | .......... H02K 11/00 |
| JP | 9-30434   | 2/1997 | ............ B62D 5/04 |
| JP | 11-115775 | 4/1999 | ............ B62D 5/04 |

* cited by examiner

Primary Examiner—Darren Schuberg
Assistant Examiner—Nguyen Hanh
(74) Attorney, Agent, or Firm—Posz Law Group, PLC

(57) ABSTRACT

A low-noise electric structure of an electric power steering device for automotive vehicles is provided which includes a controller including a substrate on which drive devices working to drive an electric motor are installed. The drive devices, power supply terminal joints, and motor terminal joints are concentrated on a portion of the substrate, thereby permitting a path of current flowing from the power supply terminal joints to the motor terminal joints to be shortened. This results in a decrease in quantity of heat generated from a circuit line extending between the power supply terminal joints and the motor terminal joints.

6 Claims, 11 Drawing Sheets

US 6,972,501 B2

CIRCUIT STRUCTURE OF ELECTRIC POWER STEERING DEVICE

BACKGROUND OF THE INVENTION

1. Technical Field of the Invention

The present invention relates generally to an improved circuit structure of an electric power steering device which may be employed to assist in turning a steering wheel of automotive vehicles and which is so designed as to produce less heat from a circuit line.

2. Background Art

Typical electric power steering devices have a substrate on which drive devices used to drive an electric motor are connected electrically to construct a motor driver. For instance, Japanese Patent First Publication No. 11-115775 discloses such an electrical structure of an electric power steering device.

The above type of electric power steering devices, however, have the problem in that a path of current flowing from power supply terminal joints which are disposed on a substrate and into which current is inputted from a power supply to motor terminal joints which are disposed on the substrate and from which the current is outputted to an electric motor is undesirably long, thereby causing an unwanted quantity of heat to be generated from circuit lines between the power supply terminal joints and the motor terminal joints.

SUMMARY OF THE INVENTION

It is therefore a principal object of the invention to avoid the disadvantages of the prior art.

It is another object of the invention to provide an electric structure of an electric power steering device which minimizes the quantity of heat generated from circuit lines extending from power supply terminal joints to motor terminal joints.

According to one aspect of the invention, there is provided an electric power steering device, which may be employed to produce a steering assist torque in automotive vehicles. The electric power steering device comprises: (a) an electric motor which is driven by supply of current; (b) a controller including a substrate on which drive devices working to drive said electric motor are connected electrically to each other; (c) power supply terminal joints which are provided on the substrate of the controller in electrical connection to the drive devices and into which current is inputted from a power supply to drive the electric motor; and (d) motor terminal joints which are provided on the substrate of the controller in electrical connection to the drive devices and from which the current inputted to the power supply terminal joints is outputted to the electric motor. The drive devices, the power supply terminal joints, and the motor terminal joints are concentrated on a portion of the substrate of the controller.

The above structure permits a path of the current flowing from the power supply terminal joints to the motor terminal joints to be shortened, thus minimizing heat produced from a circuit line extending from the power supply terminal joints to the motor terminal joints.

In the preferred mode of the invention, the controller has a control device working to control the current flowing through the electric motor. The drive devices, the power supply terminal joints, and the motor terminal joints are installed on a first side portion of the substrate, while the control device is installed on a second side portion of the substrate opposite the first side portion.

Specifically, the control device that is weak against heat is installed away from the drive devices, thereby minimizing adverse effects of the heat produced from the drive devices on the control device.

The power supply terminal joints are provided on a first end portion of the substrate of the controller, while the motor terminal joints are provided on a second end portion of the substrate opposite the first end portion, thereby facilitating ease of installation of the drive devices between the power supply terminal joints and the motor terminal joints and ease of connection of the drive devices to the power supply terminal joints and the motor terminal joints.

The electric motor works to produce torque assisting in turning a steering shaft of an automotive vehicle. The drive devices are implemented by switching transistors working to control a duty cycle of the current supplied to the electric motor, a first relay working to supply the current to the electric motor upon turning on of an ignition switch, a second relay working to cut the current flowing between the electric motor and the switching transistors, and a coil working to minimize a noise arising from the current flowing from a battery. The first relay, the second relay, and the coil are mounted on a front surface of the substrate of the controller. A cover is further provided which covers the controller and has a bulge portion covering the first relay, the second relay, and the coil.

The drive devices also includes a capacitor working to reduce a noise arising from the current flowing out of the battery. The capacitor has a length greater than heights of the first relay, the second relay, and the coil. The capacitor is mounted on a back surface of the substrate of the controller with the length extending perpendicular to the back surface of the substrate, thereby simplifying the shape of the bulge of the cover.

The substrate of the controller has formed in the second side portion a hole through which the steering shaft passes, thereby permitting the drive devices, the power supply terminal joints, and the motor terminal joints to be so installed that they are concentrated on the first side portion. This permits the path of current flowing from the power supply terminal joints and the motor terminal joints to be shortened further.

According to the second aspect of the invention, there is provided an electric power steering device which comprises: (a) an electric motor which is driven by supply of current; (b) a controller including a substrate on which drive devices working to drive the electric motor are connected electrically to each other; (c) power supply terminal joints which are provided on the substrate of the controller in electrical connection to the drive devices and into which current is inputted from a power supply to drive the electric motor; and (d) motor terminal joints which are provided on the substrate of the controller in electrical connection to the drive devices and from which the current inputted to the power supply terminal joints is outputted to the electric motor. The drive devices are arranged between the power supply terminal joints and the motor terminal joints. This permits the path of current flowing from the power supply terminal joints and the motor terminal joints to be shortened, thereby minimizing noises arising from a circuit line extending therebetween.

In the preferred mode of the invention, the controller has a control device working to control the current flowing through the electric motor. The drive devices, the power supply terminal joints, and the motor terminal joints are installed on a first side portion of the substrate, while the control device is installed on a second side portion of the substrate opposite the first side portion.

The power supply terminal joints are provided on a first end portion of the substrate of the controller, while the motor terminal joints are provided on a second end portion of the substrate opposite the first end portion.

The electric motor works to produce torque assisting in turning a steering shaft of an automotive vehicle. The drive devices are implemented by switching transistors working to control a duty cycle of the current supplied to the electric motor, a first relay working to supply the current to the electric motor upon turning on of an ignition switch, a second relay working to cut the current flowing between the electric motor and the switching transistors, and a coil working to minimize a noise arising from the current flowing from a battery. The first relay, the second relay, and the coil are mounted on a front surface of the substrate of the controller. A cover is further provided which covers the controller. The cover has a bulge portion which covers the first relay, the second relay, and the coil.

The drive devices also includes a capacitor working to reduce a noise arising from the current flowing out of the battery. The capacitor has a length greater than heights of the first relay, the second relay, and the coil. The capacitor is mounted on a back surface of the substrate of the controller with the length extending perpendicular to the back surface of the substrate, thereby simplifying the shape of the bulge of the cover.

The drive devices include switching transistors working to control a duty cycle of the current supplied to the electric motor. The joints of the switching transistors to the control substrate of the controller are all disposed between the power supply terminal joints and the motor terminal joints, thereby shortening the circuit line extending from the power supply terminal joints and the motor terminal joints.

The electric motor works to produce torque assisting in turning a steering shaft of an automotive vehicle. The substrate of the controller has formed in the second side portion a hole through which the steering shaft passes which connects with a steering wheel. Specifically, the drive devices, the power supply terminal joints, and the motor terminal joints are installed away from the hole, thereby permitting the circuit line between the power supply terminal joints to the motor terminal joints to be shortened.

A support member is further provided which is opposed to the control substrate of the controller and has the switching transistors mounted thereon.

According to the third aspect of the invention, there is provided an electric power steering device which comprises: (a) an electric motor which is driven by supply of current; (b) a controller including a substrate on which drive devices working to drive the electric motor are connected electrically, the drive devices including a first drive device connected electrically between a power supply and the electric motor and a second drive device connected electrically between the electric motor and ground; (c) power supply terminal joints which are provided on the substrate of the controller for receiving the current to be supplied to the electric motor, the power supply terminal joints including a first input terminal leading electrically to a power supply and a second input terminal connected electrically to ground; and (d) motor terminal joints which are provided on the substrate of the controller. The motor terminal joints include a first output terminal leading to the first input terminal and a second output terminal leading to the second input terminal for outputting the current to the electric motor. The first and second drive devices are mounted between the power supply terminal joints and the motor terminal joints.

Specifically, the current provided by the power supply flows from the first input terminal, to the first drive device, to the first output terminal, to the second output terminal, to the second drive device, and to the second input terminal. The first and second drive devices are mounted between the power supply terminal joints and the motor terminal joints, thus permitting each of a first circuit line connecting between the first input terminal and the first output terminal and a second circuit line connecting between the second output terminal and the second input terminal to extend only in one direction without turns. This minimizes the length of the first and second circuit lines, thus resulting in a decrease in quantity of heat produced from the first and second circuit lines.

In the preferred mode of the invention, the power supply terminal joints are provided on a first end portion of the substrate of the controller, while the motor terminal joints are provided on a second end portion of the substrate opposite the first end portion, thereby facilitating installation of the first and second drive devices between the power supply terminal joints and the motor terminal joints.

The drive devices work to control a duty cycle of the current supplied to the electric motor. The drive devices include first switching transistors connected electrically to the power supply and second switching transistors connected electrically to ground. Joints of the first and second switching transistors to the control substrate of the controller are all disposed between the power supply terminal joints and the motor terminal joints.

The first input terminal is installed close to the second input terminal. The second output terminal is installed close to the second output terminal. The substrate of the controller has formed thereon a printed circuit which includes a first conductor coupled directly to the first input terminal, a second conductor coupled directly to the second input terminal, a third conductor coupled directly to the first output terminal, and a fourth conductor coupled directly to the second output terminal. An interval between the power supply terminal joints and the motor terminal joints lies within a range defined by a first straight line extending through outer edges of the first and third conductors and a second straight line extending through outer edges of the second and fourth conductors.

Specifically, the current flows from the first to fourth conductors. Installation of the first and second drive devices within the above range minimizes the path of current circulating from the first input terminal to the second input terminal.

A support member may also be provided which is opposed to the control substrate of the controller and has the switching transistors mounted thereon. The support member serves to dissipate the heat produced from the switching transistors.

The controller includes a control device working to control the current flowing through the electric motor. The first and second drive devices, the power supply terminal joints, and the motor terminal joints are disposed on a first side portion of the substrate of the controller. The control device is installed on a second side portion of the substrate. The substrate of the controller has formed in the second side portion a hole through which the steering shaft passes which connects with a steering wheel. Specifically, the drive devices, the power supply terminal joints, and the motor terminal joints are installed away from the hole, thereby permitting the circuit line between the power supply terminal joints to the motor terminal joints to be shortened.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
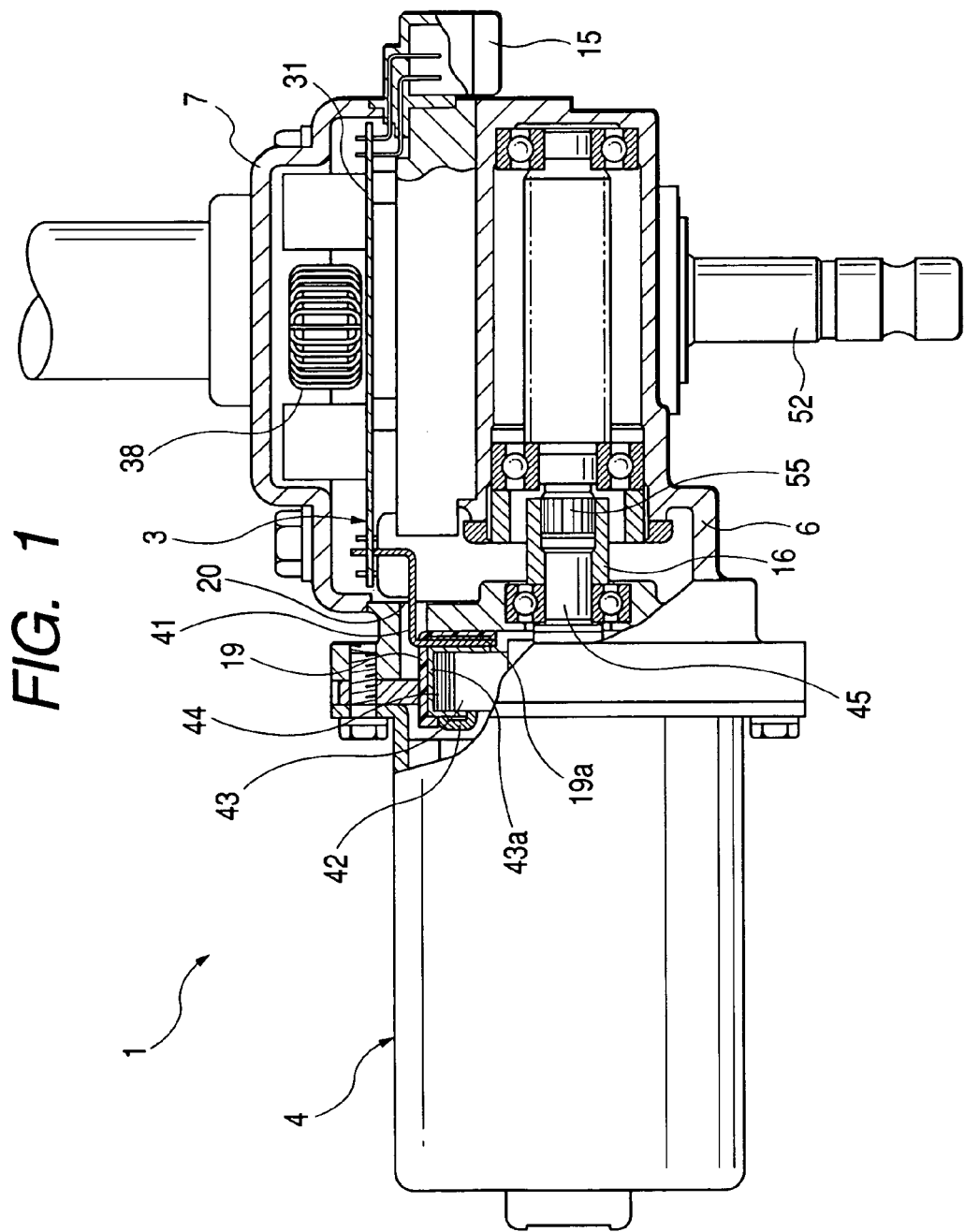
FIG. 1 is a partially sectional view which shows an electric power steering device according to the first embodiment of the invention.
Figure 2:
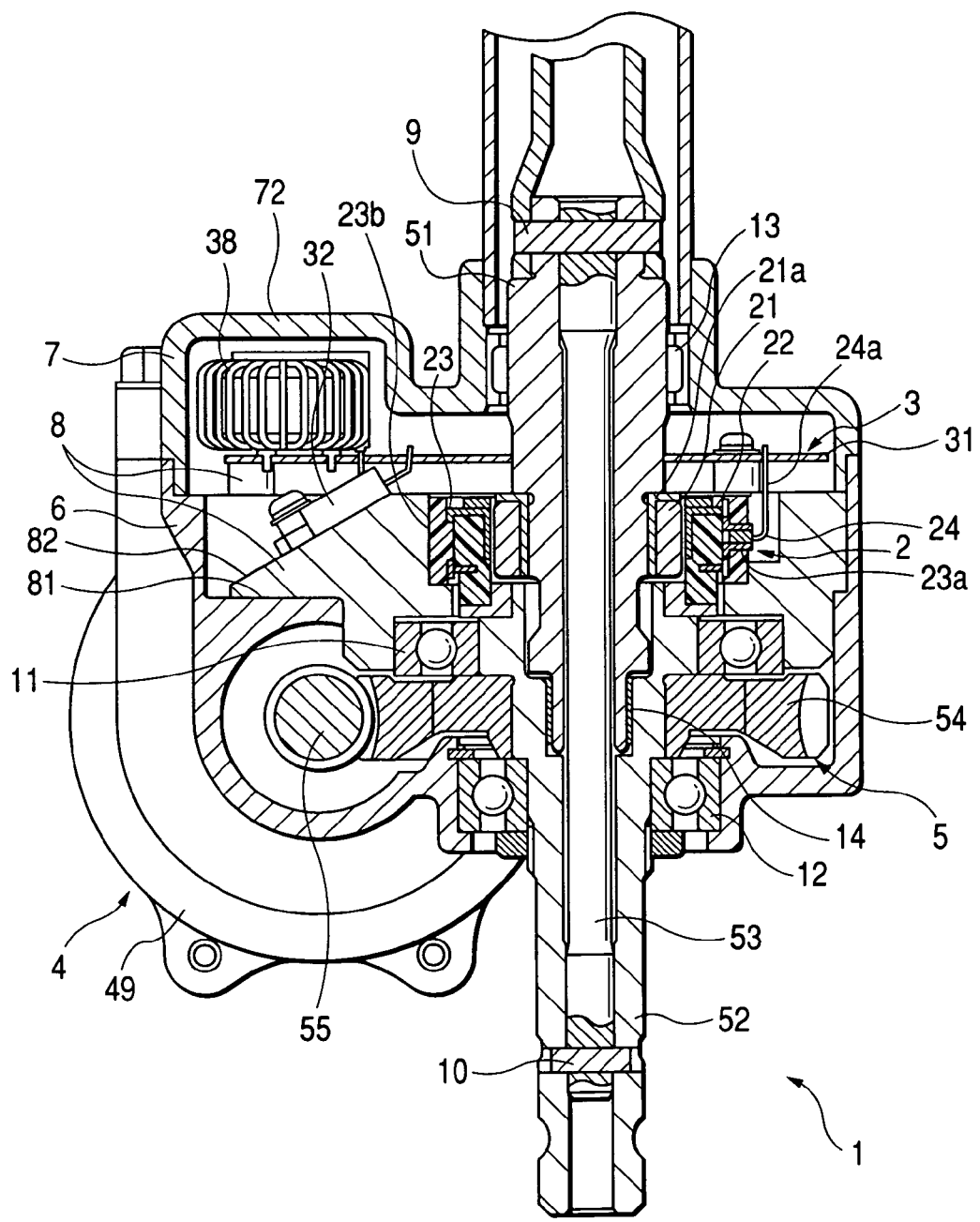
FIG. 2 is a longitudinal sectional view of the electric power steering device as illustrated in FIG. 1.

Referring to the drawings, wherein like reference numbers refer to like parts in several views, particularly to FIGS. 1 and 2, there is shown an electric power steering device 1 according to the first embodiment of the invention.

The electric power steering device 1 is installed within a cabin of an automotive vehicle and consists essentially of a torque sensor 2, a controller 3, an electric motor 4, and a torque transmission mechanism 5. The torque sensor 2, the controller 3, and the torque transmission mechanism 5 are installed within a chamber defined by a housing 6 and a cover 7. The electric motor 4 is installed within a yoke 49.

A steering shaft is made up of an input shaft 51, an output shaft 52, and a torsion bar 53 and is supported by bearings 11, 12, 13, and 14. The input shaft 51 is typically coupled with a steering wheel (not shown) and, as clearly shown in FIG. 2, disposed rotatably within the output shaft 52 through the bearing 14.

The output shaft 52 is aligned with the input shaft 51 and coupled therewith rotatably through the torsion bar 53.

The torsion bar 53 is fitted within cylindrical chambers of the input and output shafts 51 and 52 and joined thereto at ends through pins 9 and 10. The torsoin bar 53 serves as an elastic member. Specifically, rotation of the steering shaft produces torque which is, in turn, applied to the input shaft 51, thereby causing the torsion bar 53 to be twisted elastically around a longitudinal center line thereof, so that the input and output shaft 51 and 52 rotate relative to each other.

The torque sensor 2 works to measure a steering torque added to the steering wheel by a vehicle driver and is made up of a magnet 21, a magnetic yoke 22, a pair of magnetic flux collection rings 23, and a magnetic sensor 24.

The magnet 21 is made of a ring-shaped hard magnetic material and press fit over the periphery of the input shaft 51 through a magnetic retainer 21a. The magnet 21 has N- and S-poles disposed alternately.

The magnetic yoke 22 is joined to the output shaft 52 and consists of a pair of rings each of which is made of a soft magnetic material and has as many magnetic teeth (not shown) functioning as the N-poles or the S-poles of the magnet 21 disposed on the whole periphery thereof at regular intervals. The magnetic yoke 22 is located at a given air gap from the periphery of the magnet 21 coaxially therewith. Each of the teeth of one of the rings of the magnetic yoke 22 is shifted in a circumferential direction of the magnetic yoke 22 from one of the teeth of the other ring. Specifically, each of the teeth of one of the rings of the magnetic yoke 22 is interposed between adjacent two of the teeth of the other ring. The magnetic yoke 22 is placed within the magnetic field produced by the magnet 21 to form a magnetic circuit along with the magnet 21 and works to change the density of magnetic flux flowing within the magnetic circuit when the magnetic yoke 22 is changed in relative position to the magnet 21 due to twisting of the torsion bar 52.

The magnetic flux collection rings 23 are, like the magnetic yoke 22, made of a soft magnetic material and located close to the periphery of the magnetic yoke 22. The magnetic flux collection rings 23 work to collect magnetic fluxes emerging from the magnet 21 through the magnetic yoke 22. The magnetic flux collection rings 23 are installed on an inner peripheral wall of a support member 8, as will be described later in detail, through a ring retainer 23b. Specifically, the magnetic flux collection rings 23 are installed integrally within the ring retainer 23b. For instance, the magnetic flux collection rings 23 are insert-molded within the ring retainer 23b. One of the magnetic flux collection rings 23 has a magnetic collection plate 23a which is formed on a circumferential end thereof and extends in the axial direction of the input and output shafts 51 and 52. A portion of the upper magnetic flux collection ring 23 facing the magnetic collection plate 23a is curved continuously from the remainder of the upper magnetic flux collection ring 23 and functions to collect the magnetic fluxes generated by the magnet 21 together with the magnetic collection plate 23a, but may alternatively be machined to have a flat surface opposed to the magnetic collection plate 23a in the radius direction of the magnetic flux collection rings 23.

The magnetic sensor 24 is interposed between the magnetic collection plate 23a of one of the magnetic flux collection rings 23 and the other magnetic flux collection ring 23 and works to measure the density of magnetic flux flowing therethrough and output an electrical signal (e.g., a voltage signal) indicative thereof. The magnetic sensor 24 is made of a Hall IC and secured to the support member 8 through the magnetic collection retainer 23b. The magnetic senor 24 has L-shaped Hall IC terminals which extend toward the steering wheel and are soldered to a control substrate 31 of the controller 3.

In operation, when the steering torque is added to the input shaft 51, and the torsion bar 53 is twisted, it will cause the magnetic yoke 22 to change its relative position to the magnet 21 in the circumferential direction thereof. The magnetic flux produced by the magnet 21 is guided to the magnetic collection plate 23a of the magnetic flux collection rings 23 through the magnetic yoke 22. The change in relative position of the magnetic yoke 22 to the magnet 21 causes the density of magnetic flux between the magnetic collection plate 23a and the opposite magnetic flux correction ring 23 to change. The magnetic sensor 24 detects such a change as a function of the steering torque applied to the input shaft 51 and output a signal indicative thereof to the controller 3.

The controller 3 works to control the duty cycle of current flowing through the electric motor 4 as a function of the steering torque measured by the torque sensor 2 (i.e., the magnetic sensor 24).

Figure 4A:
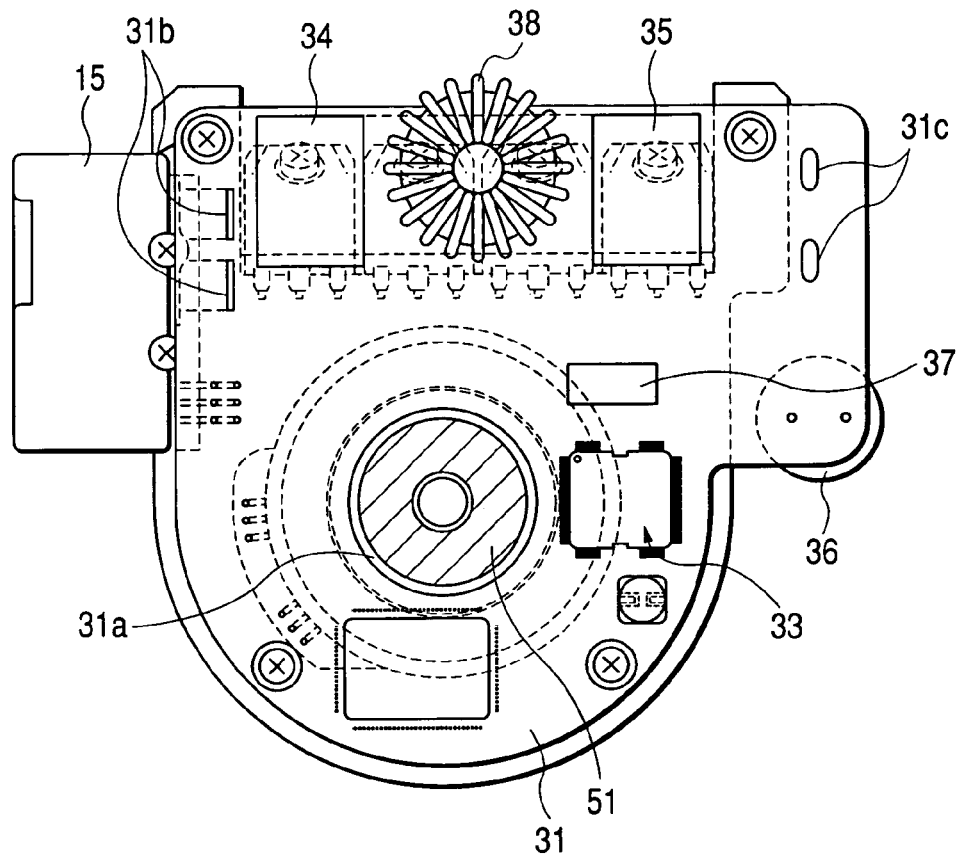
FIG. 4(a) is a front view which shows the control substrate in FIG. 3.
Figure 7:
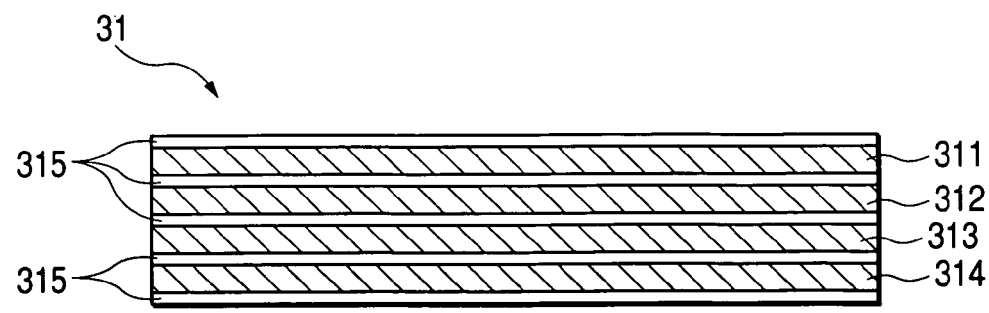
FIG. 7 is a sectional view which shows a substrate of a controller.
Figure 8:
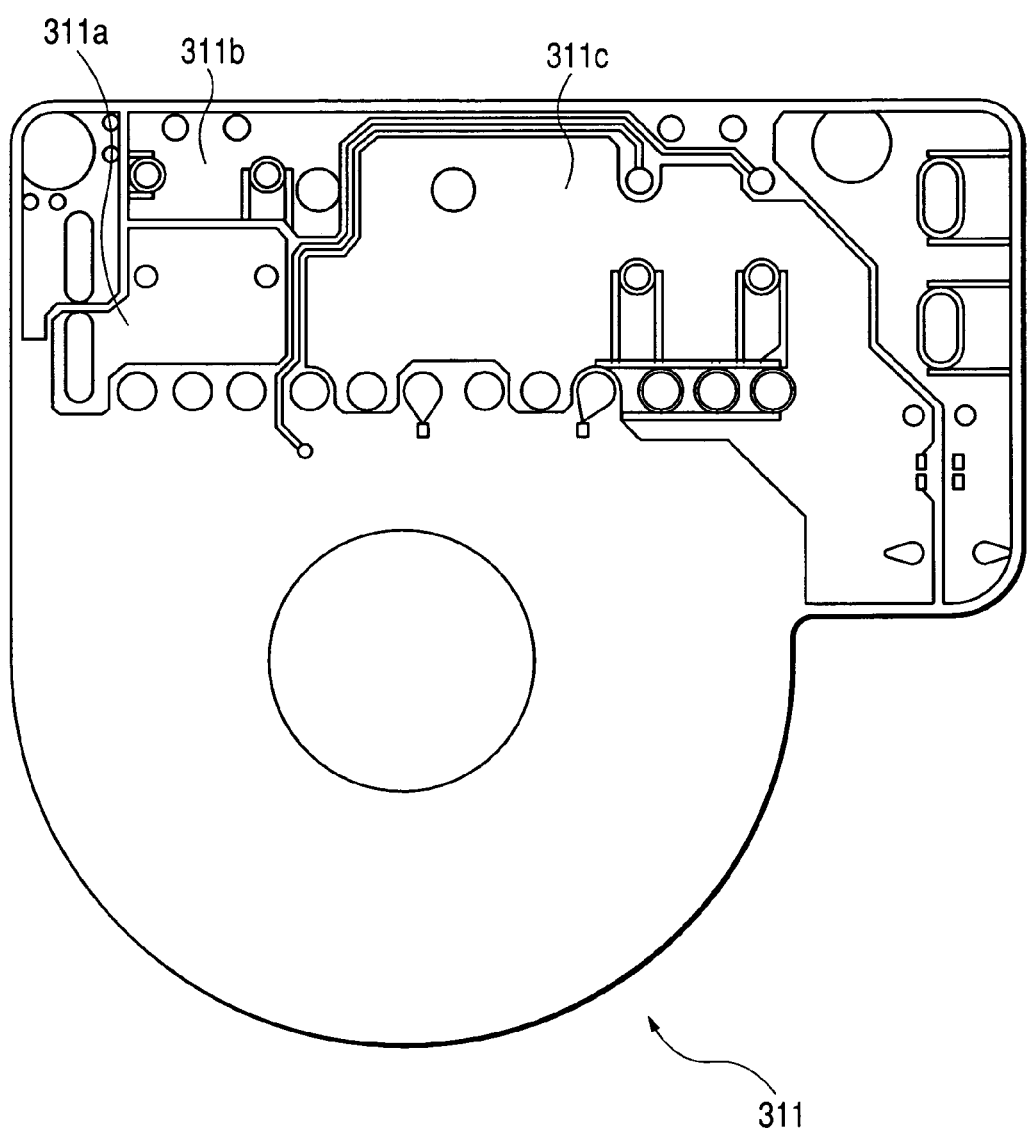
FIG. 8 is a plane view which shows a first patterned conductive layer of the substrate as illustrated in FIG. 7.
Figure 9:
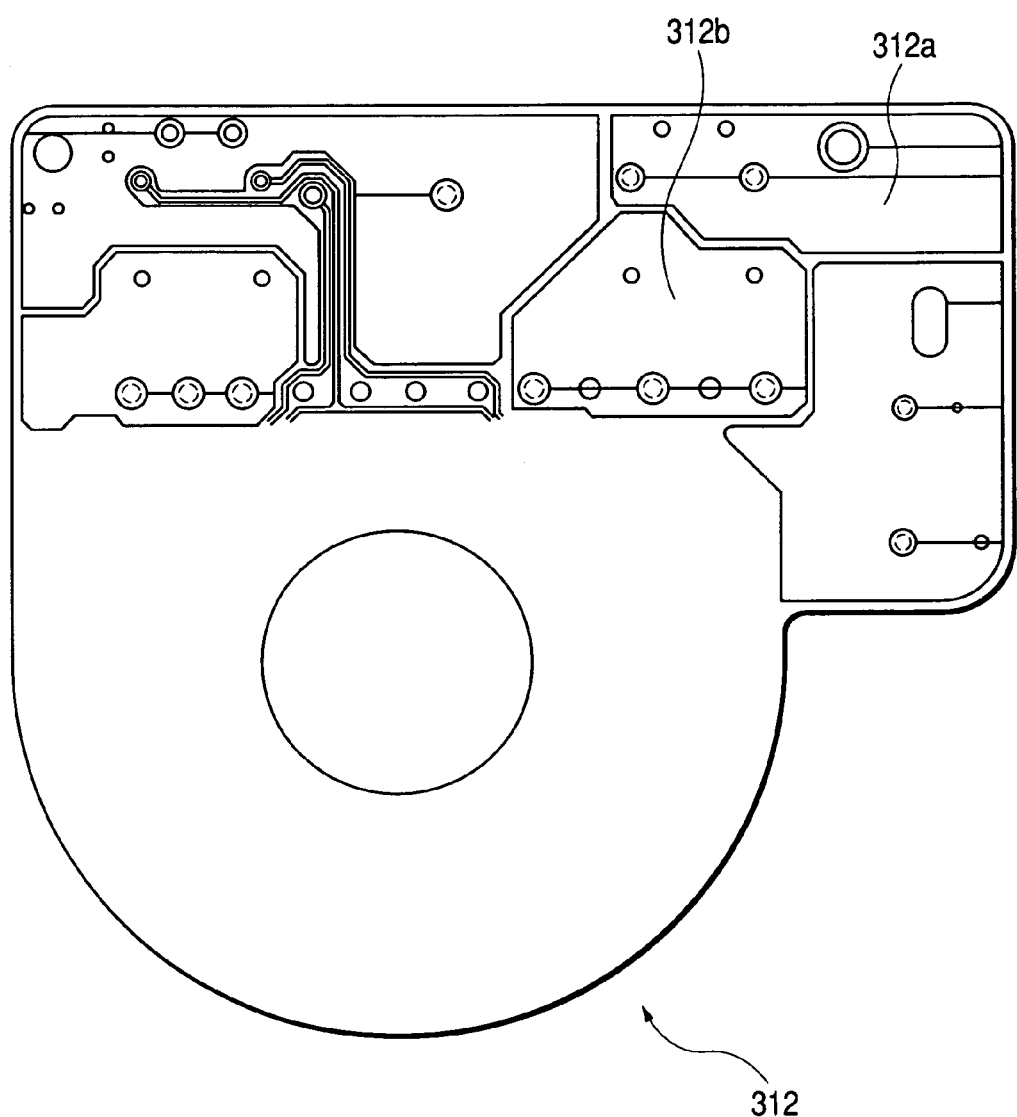
FIG. 9 is a plane view which shows a second patterned conductive layer of the substrate as illustrated in FIG. 7.
Figure 10:
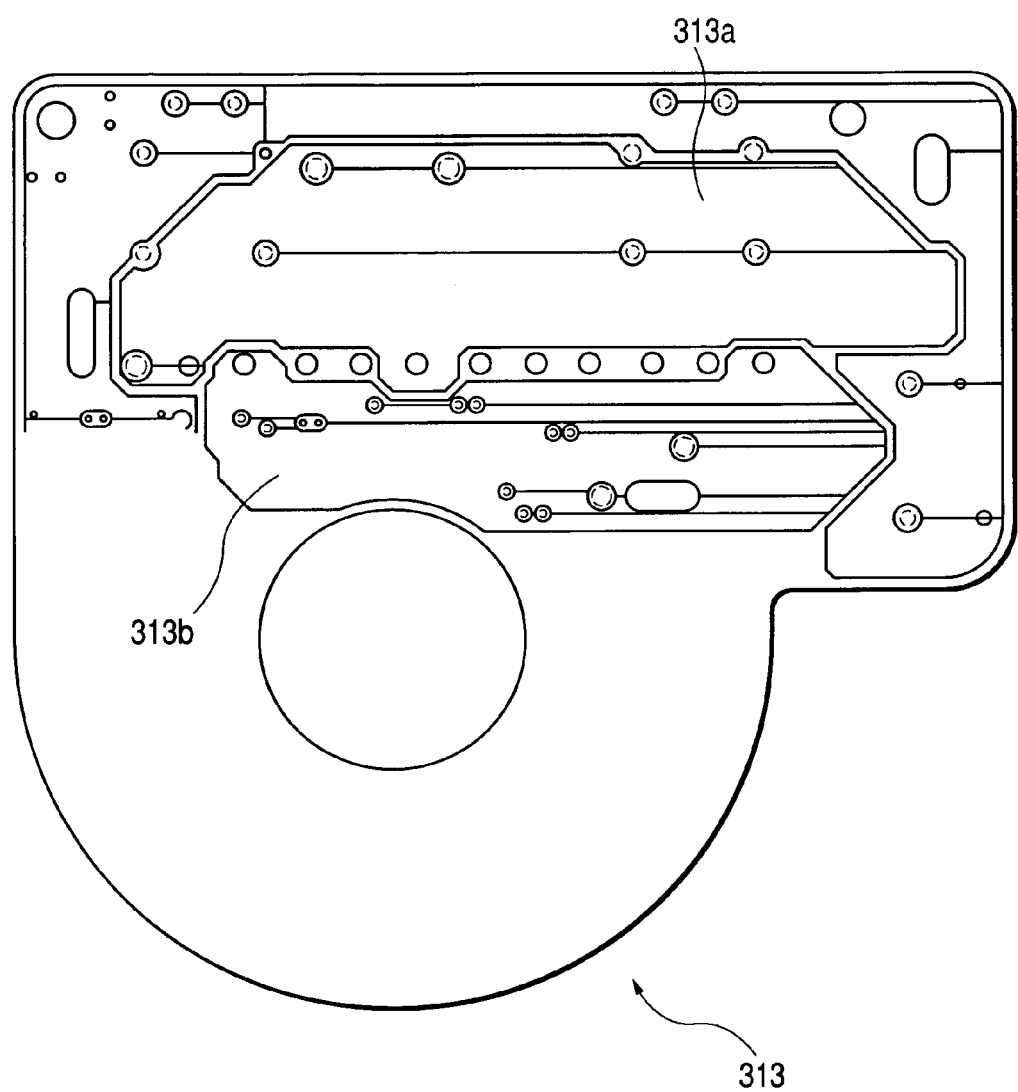
FIG. 10 is a plane view which shows a third patterned conductive layer of the substrate as illustrated in FIG. 7.
Figure 11:
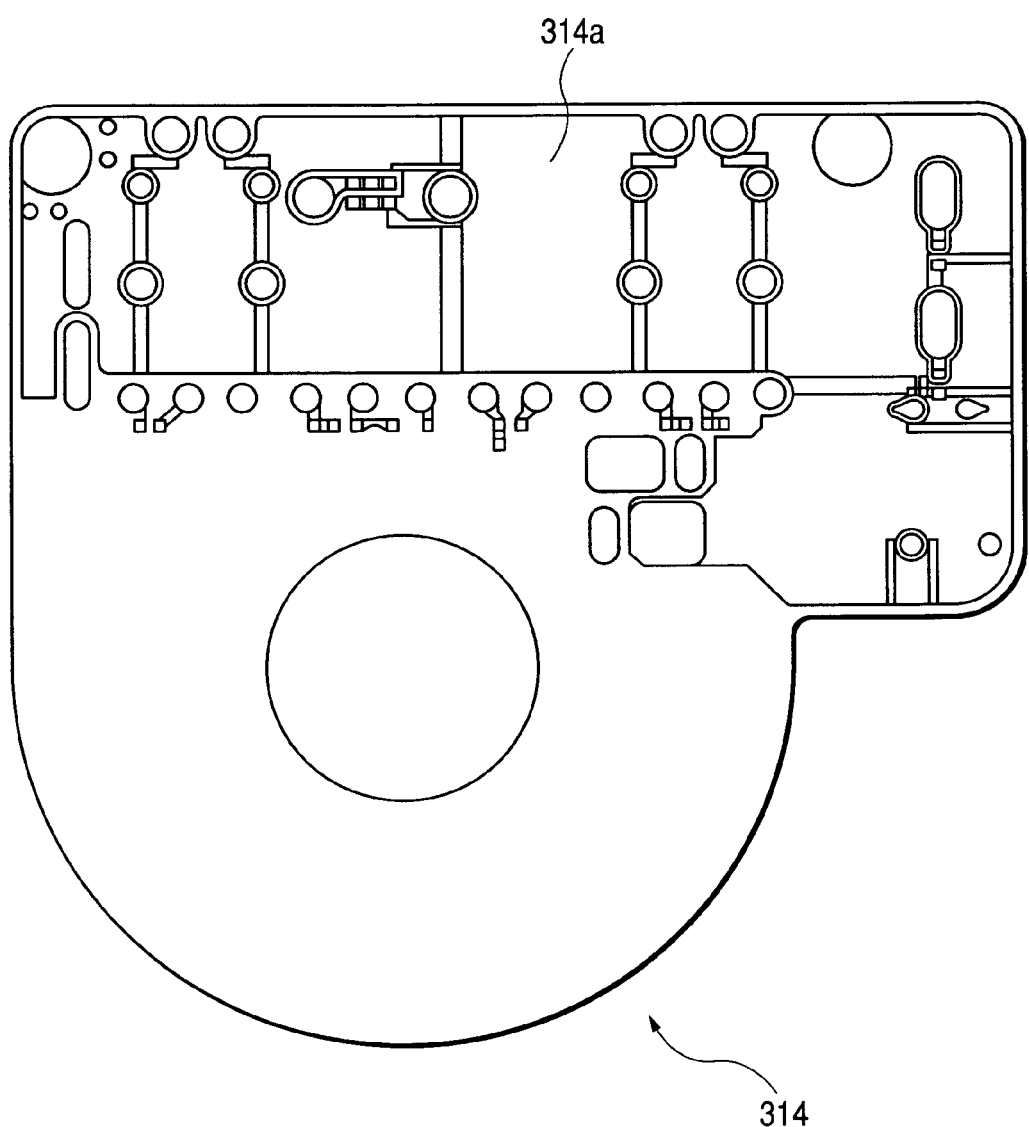
FIG. 11 is a plane view which shows a fourth patterned conductive layer of the substrate as illustrated in FIG. 7.

The control substrate 31 is, as clearly shown in FIG. 4(a), made up of a rectangular section and a semi-circular section. The semi-circular section has formed in central portion thereof a hole 31a through which the input shaft 51 passes. The control substrate 31 has formed therein power supply terminal joints 31b leading to the battery to receive the current employed in driving the electric motor 4 and motor terminal joints 31c leading to motor terminals 41 of the electric motor 4, as shown in FIG. 1, to output the current thereto. The control substrate 31, as illustrated in FIG. 7, consists of a first patterned conductive layer 311, a second patterned conductive layer 312, a third patterned conductive layer 313, a fourth patterned conductive layer 314, and insulating layers 315 disposed therebetween.

The power supply terminal joints 31b are provided on an end portion of the control substrate 31 and coupled electrically to the storage battery installed in the vehicle through the power supply connector 15. The power supply connector 15 is also coupled to an ECU (Electronic Control Unit) as well as to the storage battery. The motor terminal joints 31c are disposed on the other end portion of the control substrate 31 and coupled electrically to the electric motor 4 through the motor terminals 41.

Figure 3:
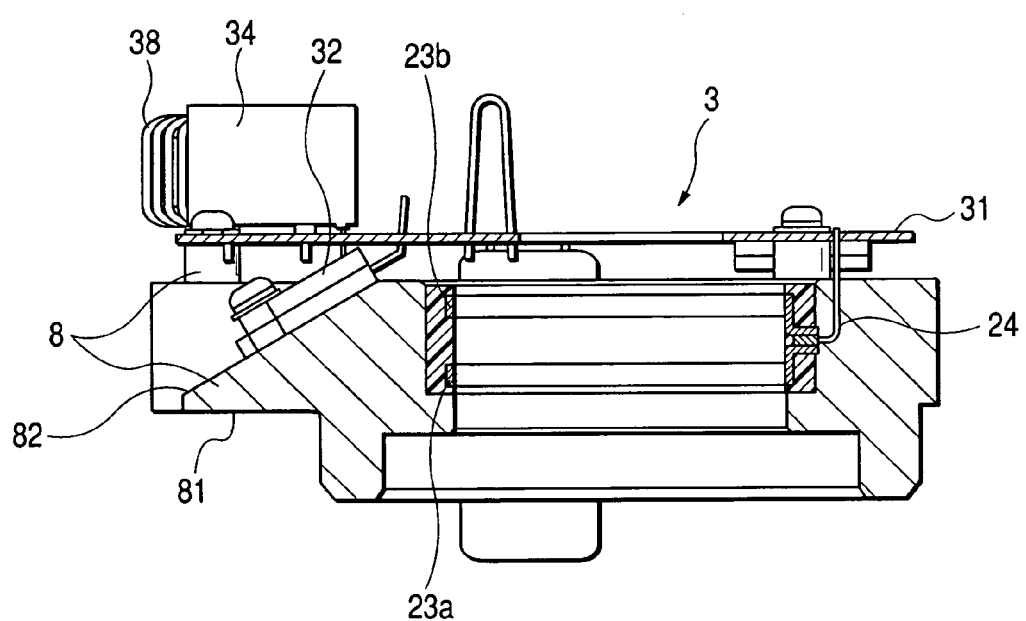
FIG. 3 is a partially longitudinal sectional view which shows a control substrate and a support member of the electric power steering device of FIG. 1.

Switching transistors 32 are, as clearly shown in FIG. 3, mounted directly on a slant surface 82 of the support member 8 through a screw. Each of the switching transistors 32 has, as shown in FIG. 2, terminals which extend from a side wall thereof, are bent toward the steering wheel, and soldered to the control substrate 31.

The control substrate 31 has fabricated directly thereon, as clearly shown in FIGS. 3 and 4(a), a control device 33, relays 34 and 35, a capacitor 36, a shunt resistor 37, and a coil 38 working to minimize an electrical noise arising from the current flowing from the battery. The control substrate 31 is joined to terminals of the torque sensor 2 for reception of an output of the torque sensor 2 indicative of the steering torque.

The control device 33 is implemented by a microcomputer which determines the current supplied to the electric motor 4 as a function of the steering torque as measured by the torque sensor 2 and produces PWM (Pulse Width Modulated) drive signals to drive the switching transistors 32.

Figure 5:
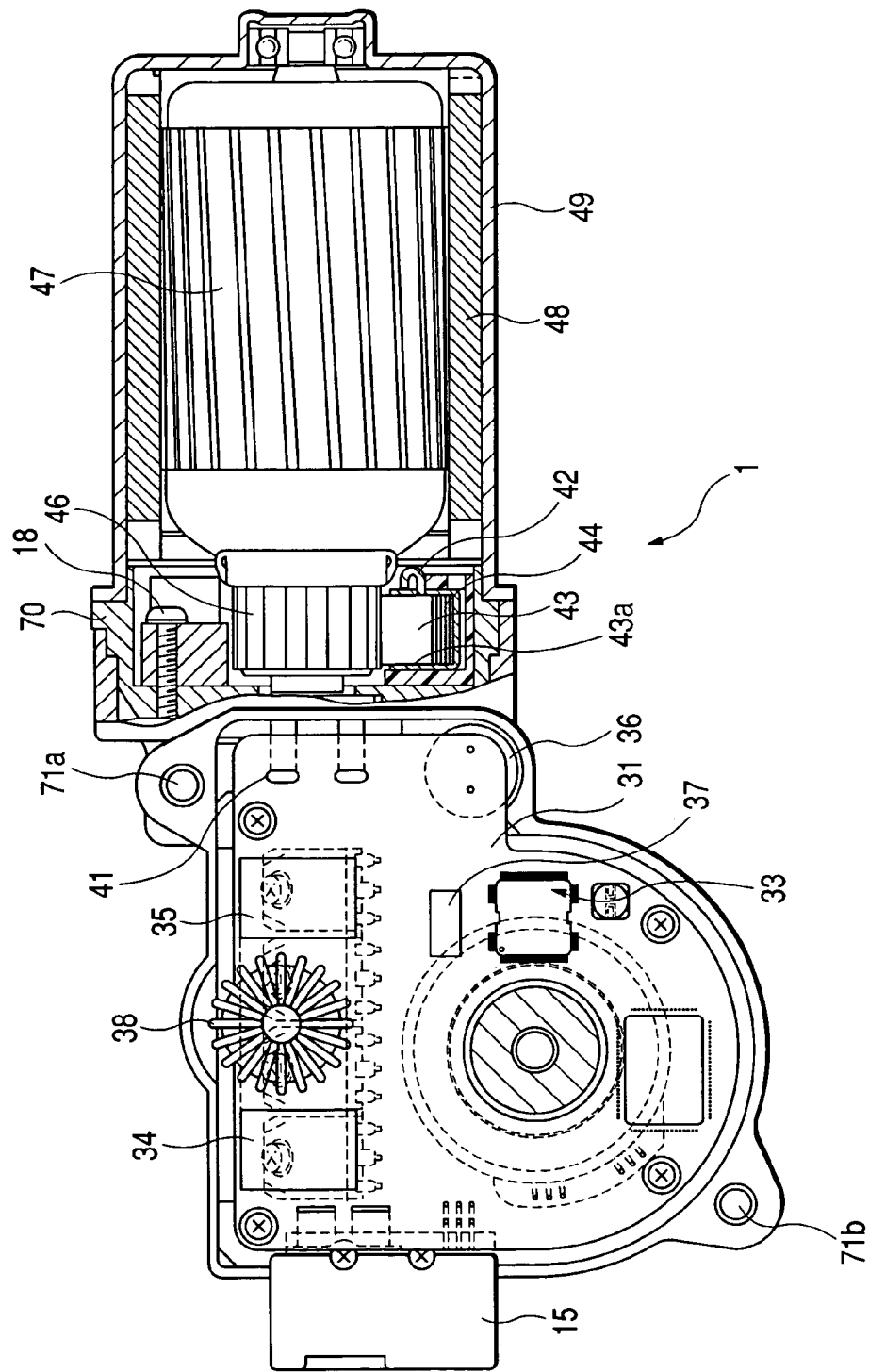
FIG. 5 is a sectional view as taken in a radius direction of the electric power steering device of FIG. 1.

The relays 34 and 35 and the coil 38 are, as can be seen from FIGS. 4(a) and 5, are mounted on a surface of an end portion of the control substrate 31 between the power supply terminal joints 31b and the motor terminal joints 31c.

The relay 34 is responsive to an on/off operation of an ignition switch (not shown) of the automotive vehicle to cut the supply of the current to the electric motor 4 selectively. The relay 35 works to cut the flow of current between the switching transistor 32 and the electric motor 4 in order to avoid power generation of the electric motor 4 arising from input of the steering torque to the electric motor 4 when a drive circuit for the electric motor 4 fails. The capacitor 36 works to minimize electrical noises arising from the current flowing from the power supply connector 15 (i.e., the battery). The capacitor 36 has a length which is, as can be seen from FIG. 4(b), greater than heights of the relays 34 and 35 and the coil 38 and which extends perpendicular to the plane of the control substrate 31.

The motor drive circuit 3a of the controller 3 will be described below with reference to FIG. 6.

The battery 150 is connected at a plus (+) terminal to an end of the capacitor 36 and the switching transistors 32 through the relay 34 and the coil 38 and at a minus (−) terminal to the other end of the capacitor 36. The switching transistors 32 are connected to the minus terminal of the battery 150 through the shunt resistor 37. The four switching transistors 32 are joined to form a bridge circuit which is responsive to the PWM drive signal produced by the control circuit (not shown) to which the control device 33 is connected to control the duty cycle of current supplied to the electric motor 4 through the relay 35. The control circuit works to receive a voltage equivalent to a voltage drop in the shunt resistor 37, measure the current flowing through the electric motor 4, and produce the PWM drive signals.

Wiring of the motor drive circuit on the control substrate 31 will be described below with reference to FIGS. 8, 9, 10, and 11.

One of the power supply terminal joints 31b leading to the plus terminal of the battery through the power supply connector 15 is connected to a first patterned conductor 311a on the first patterned conductive layer 311. The first patterned conductor 311a is connected to the second patterned conductor 311b through the relay 34. The second patterned conductor 311b is connected to the third patterned conductor 311c through the coil 38. The third patterned conductor 311c is connected to the capacitor 36 and also to the fourth patterned conductor 313a through the switching transistors 32. The fourth patterned conductor 313a is connected to the motor terminal joints 31c and also to the fifth patterned conductor 312a through the relay 35. The fifth patterned conductor 312a is connected to the sixth patterned conductor 312b and the seventh patterned conductor 313b through the switching transistors 32. The seventh patterned conductor 313b is connected to the eighth patterned conductor 314a through the shunt resistor 314a. The eighth patterned conductor 314a is connected to one of the power supply terminal joints 31b leading to the minus terminal of the battery through the power supply connector 15. The first to eighth patterned conductors 311a to 314a work as connecting conductors joining between the power supply terminal joints 31b and the motor terminal joints 31c. Patterned conductors other than the first to eighth patterned conductors are joined to the ground terminal of the power supply connector 15.

The electric motor 4 works to provide torque to the output shaft 52 for assisting a vehicle operator in rotating the steering wheel. The electric motor 4 is, as shown in FIG. 5, a dc motor made up of a field, an armature 47, and a brush 43. The field has a magnet 48 installed on an inner periphery of the yoke 49 which is made of a magnetic material and serves as a motor housing. The armature 47 is supported rotatably by the inner periphery of the field. The brush 43 is in contact with a commutator 46 installed on the armature 47. The brush 43 is urged by a spring 44 installed within a brush holder 43a into constant abutment to the commutator 46. The yoke 49 has an open end attached to a side surface of the housing 6 and is secured to a frame end 70 through a bolt 18.

The electric motor 4, as can be seen in FIG. 1, has pigtails 42 connected to the brush 43 electrically and is equipped with metallic motor terminals 41 installed within the housing 6. The motor terminals 41 are joined to a plate 19a by resistance welding which is insert-molded in a resinous holder plate 19.

The holder plate 19 serves to retain the brush holder 43a which supports the brush 43 to be slidable and is, as shown in FIG. 5, disposed within the frame end 70 attached to the open end of the electric motor 4. In the attachment of the electric motor 4 to the housing 6, the electric motor 4 is first inserted into the housing 6 through an opening 20.

The motor terminals 41 work to supply the power to the electric motor 4. The motor terminals 41 are bent at substantially right angles and joined at ends thereof to a terminal plate 43c, as shown in FIG. 6, retained between the end frame 43d and the brush holder 43c through a rubber mount 43b. The other ends of the motor terminals 41 are soldered to the control substrate 31 of the controller 3 after the electric motor 4 is secured to the housing 6.

The end frame 43d is made of a metal plate and secured to the yoke 49 between the yoke 49 and the housing 6. The rubber mount 43b works to absorb vibrations arising from sliding motion of the brush 43 on the periphery of the commutator 46. The terminal plate 43c is made of a resinous member with metal terminals disposed therein. The metal terminals connect between the motor terminals 41 and the pigtails 42 for supplying the current from the battery to the brush 43.

The current which is determined in duty cycle by the controller 3 and adjusted by the switching transistor 32 is supplied to the armature 47 through the motor terminals 41, the plate 19a, the pigtails 42, and the brush 43.

The torque transmission mechanism 5 works to transmit a steering assist torque produced by the electric motor 4 to wheels to be steered. The torque transmission mechanism 5 is made up of the input shaft 51, the output shaft 52, the torsion bar 53, the worm wheel 54, the worm gear 55, an armature shaft 45, and a sleeve 16. The armature shaft 45, the sleeve 16, and the worm gear 55 are aligned perpendicular to the input shaft 51, the output shaft 52, and the torsion bar 53.

The armature shaft 45 is connected to the armature 47. The armature shaft 47 is press fit in the sleeve 16.

The worm gear 55 is, as can be seen in FIG. 1, rotated by an output torque of the armature shaft 45 of the electric motor 4 transmitted through the sleeve 16 fitted over the armature shaft 45. The worm gear 55 has formed in an outer surface thereof helical splines meshing with the sleeve 16.

The worm wheel 54 is, as shown in FIG. 2, installed on the periphery of the output shaft 52 and meshes with the worm gear 55 so that it is rotated by rotation of the worm gear 55.

The housing 6 defines an aluminum shell within which the torque transmission mechanism 5 and the support member 8 are disposed. The housing 6 supports the output shaft 52 rotatably through the bearing 12.

The cover 7 defines an aluminum shell which covers an open end of the housing 6 oriented in an axial direction of the steering shaft. The cover 7 has installed on the inner wall thereof the bearing 13 which bears the input shaft 51 rotatably. When installed on the housing 6, the cover 7 urges the support member 8 into abutment to an inner wall of the housing 6. This causes the support member 8 to be placed in a nip between the end surface 7a of the cover 7 and the inner wall 6a of the housing 6. The cover 7 is affixed to, as shown in FIG. 5, flanges 71a and 71b of the housing 6. The flange 71a is preferably located inside an imaginary plane defined on the profile of the housing 6. The flange 71b is diametrically opposed to the flange 71a across the torsion bar 53. The cover 7 has, as clearly shown in FIG. 1, a bulge 72 which covers the relays 34 and 35 and the coil 38.

Figure 4B:
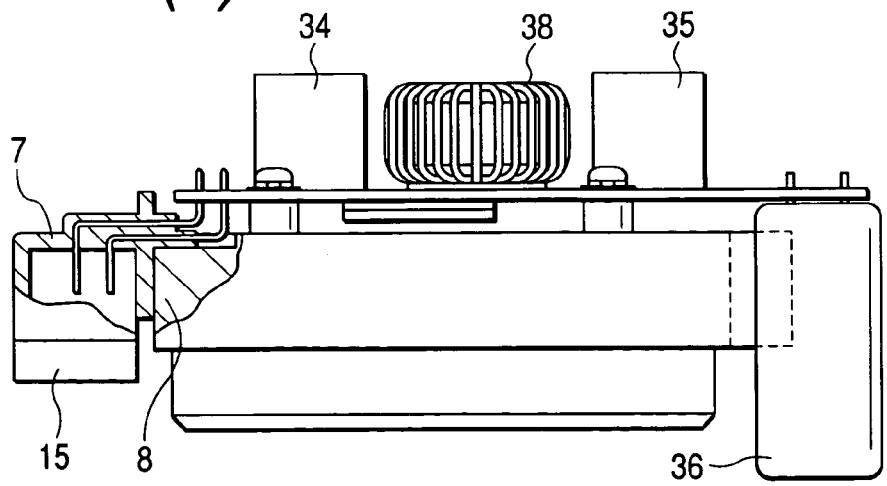
FIG. 4(b) is a side view of FIG. 4(a)

The support member 8 is made of an aluminum material and disposed within a chamber defined between the housing 6 and the cover 7. The support member 8, as clearly shown in FIG. 2, bears the controller 3 at a surface thereof facing the steering wheel and is retained within the housing 6 in abutment of an opposite surface thereof to the inner wall of the housing 6. The support member 8, as already described, has the ring retainer 23b in which the magnetic flux collection rings 23 are disposed and pivots the output shaft 52 through the bearing 11. The support member 8 has a holder flange 81 which is in abutment of a surface opposed to the switching transistors 32 to the inner wall of the housing 6. The support member 8, as shown in FIG. 4(b), has installed thereon the power supply connector 15 which has power supply or feeder terminals leading to the battery (not shown) installed in the vehicle and signal terminals for receiving a vehicle speed signal and an engine speed signal.

The installation of the support member 8 within the housing 6 is achieved after the controller 3 is, as shown in FIG. 3, mounted on the support member 8.

As apparent from the above discussion, the electric power steering device 1 has the switching transistors 32, the relays 34 and 35, the capacitor 36, the shunt resistor 37, and the coil 38 which work as motor drive devices, the power supply terminal joints 31b, and the motor terminal joints 31c concentrated on an end portion of the control substrate 31. Most of the motor drive devices (i.e., the switching transistors 32, the relays 34 and 35, and the coil 38) are disposed within a space defined between the power supply terminal joints 31b and the motor terminal joints 31c. This structure enables the first to eighth patterned conductors 311a to 314a to be disposed between the power supply terminal joints 31b and the motor terminal joints 31c, which results in a decrease in length of a circuit path between the power supply terminal joints 31b and the motor terminal joints 31c, thus decreasing the quantity of heat generated from the first to eighth patterned conductors 311a to 314a.

The control device 33 is mounted on the control substrate 31 away from the switching transistors 32, the relays 34 and 35, the capacitor 36, the shunt resistor 37, and the coil 38, so that the control device 33 is hardly subjected to heat generated therefrom.

The power supply terminal joints 31b are located on one end of the control substrate 31, while the motor terminal joints 31c are located on the other end of the control substrate 31, thus providing ease of installation of the relays 34 and 35 and the coil 38 between the power supply terminal joints 31b and the motor terminal joints 31c and also facilitating ease of connections between the power supply terminal joints 31b and the power supply connector 15 and between the motor terminal joints 31c and the electric motor 4.

The relays 34 and 35 that are greater in size are mounted on the surface of the end portion of the control substrate 31, thus permitting the bulge 72 to be simplified in shape, which results in improved manufacturability of the die-cast cover 7.

The capacitor 36 has the length which is greater than heights of the relays 34 and 35 and the coil 38 and mounted directly on the back surface of the control substrate 31 with the length extending perpendicular to the control substrate 31, thereby minimizing the complexity of shape of the bulge 72 of the cover 7.

The capacitor 36 and the shunt resistor 37 are not disposed between the power supply terminal joints 31b and the motor terminal joints 31c, but they may alternatively be mounted therebetween in order to shorten the current path leading to the electric motor 4.

Typical electric power steering devices have a plurality of switching transistors 32. Therefore, installation of all joints of the switching transistors 32 with the control substrate 31 between the power supply terminal joints 31b and the motor terminal joints 31c results in a decreased path of current flowing through the first to eighth patterned conductors 311a to 314a.

The switching transistors 32 are not mounted directly on the control substrate 31, but secured to the slant surface 82 of the support member 8 using screws, thus facilitating dissipation of heat generated by the switching transistors 32 from the support member 8 without increases in size of the control substrate 31 and the first to eighth patterned conductors 311a to 314a and an increase in length of the path of current flowing through the first to eighth patterned conductors 311a to 314a.

The circular hole 31a is formed in an end portion of the control substrate 31 on which the control devices 33 is mounted, thus permitting the path of current flowing through the first to eighth patterned conductors 311a to 314a to be straight to minimize the length thereof.

Figure 12:
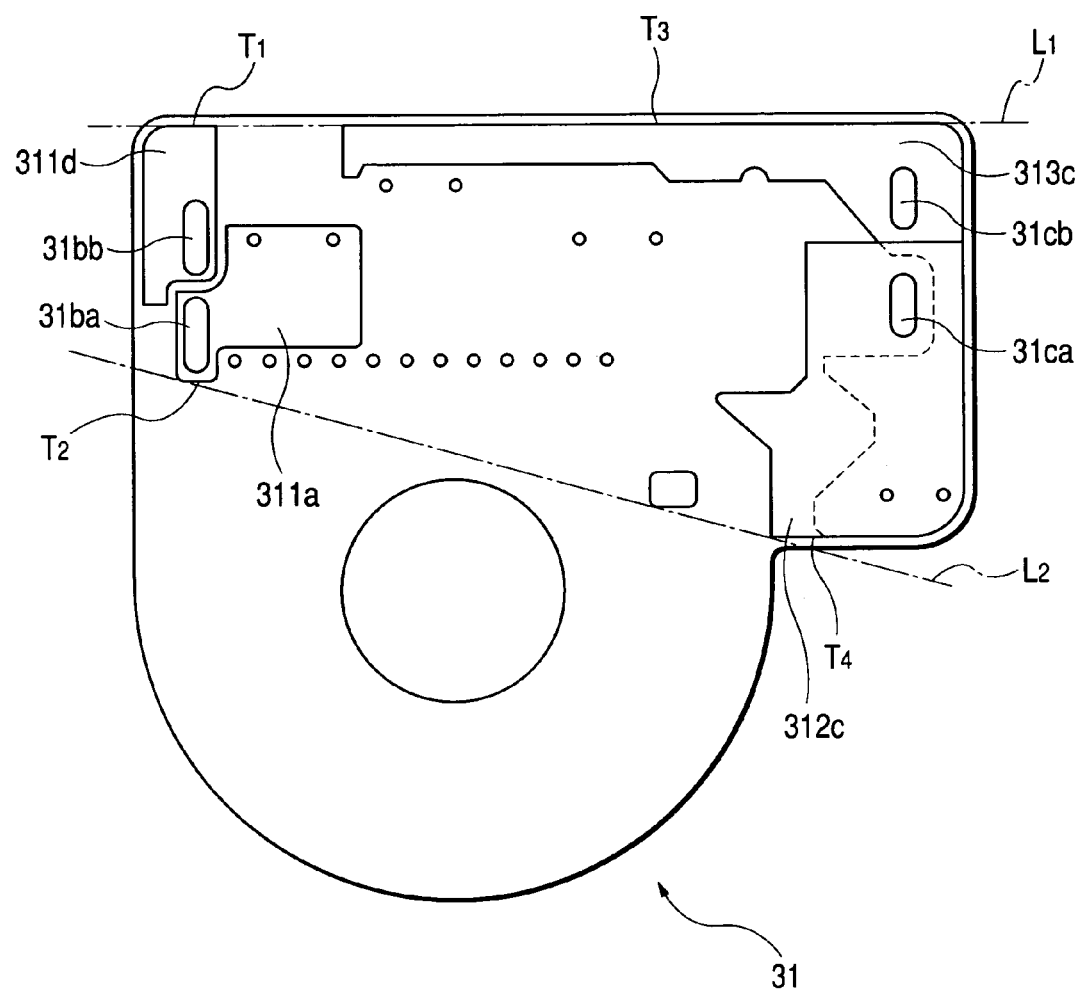
FIG. 12 is a plane view which shows the part of first to third patterned conductors lapped over another in the second embodiment of the invention.

FIG. 12 shows the part of the first to third patterned conductors lapped over another in the second embodiment of the invention.

The power supply terminal joints 31b are made up of a first input terminal 31ba connected electrically to the power supply connector 15 and a second input terminal 31bb connected to ground. The motor terminal joints 31c are made up of a first output terminal 31ca and a second output terminal 31cb coupled electrically with the first and second input terminals 31ba and 31bb through the patterned conductors.

Figure 6:
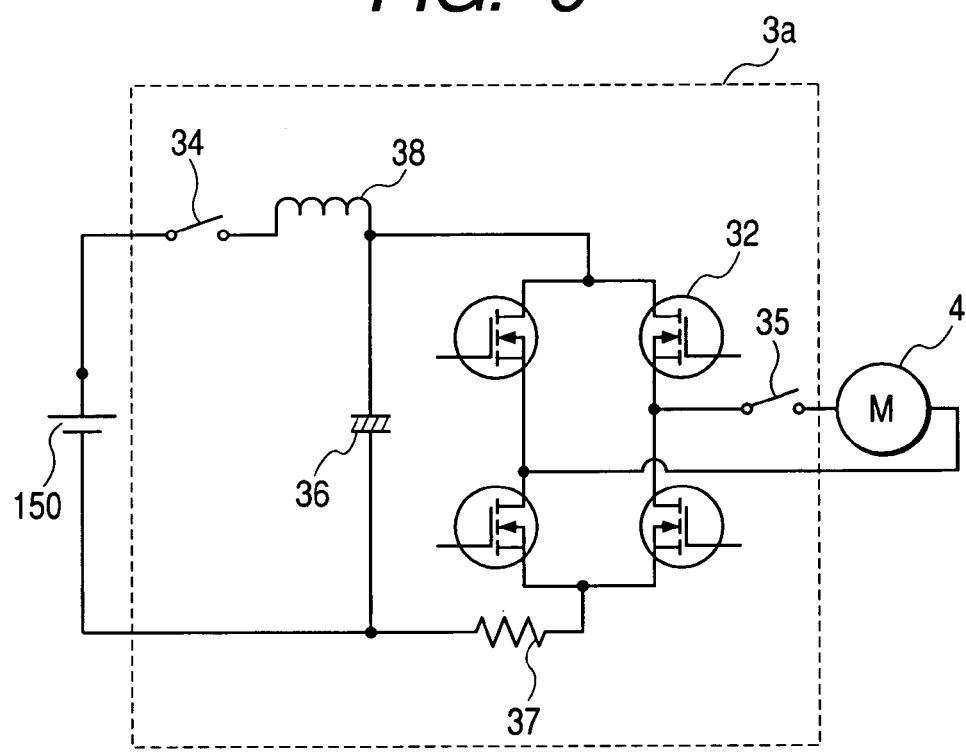
FIG. 6 is a circuit diagram which shows a drive circuit for an electric motor.

The relays 34 and 35, the coil 38, the capacitor 36, and upper flow-side (i.e., upstream) two of the switching transistors 32, as viewed in FIG. 6, are connected electrically between the first input terminal 31ba and the first output terminal 31ca.

Lower flow-side (i.e., downstream) two of the switching transistors 32, as viewed in FIG. 6, and the shunt resistor 37 are connected electrically between the second output terminal 31cb and the second input terminal 31bb.

The first input terminal 31ba is connected directly to the first patterned conductor 311a. The second input terminal 31bb is connected directly to the ninth patterned conductor 311d. The first output terminal 31ca is connected directly to the tenth patterned conductor 312c. The second output terminal 31cb is connected directly to the eleventh patterned conductor 313c.

A total width of the first patterned conductor 311a and the ninth patterned conductor 311d is equivalent to the distance between an end T1 of the first patterned conductor 311a and an opposite end T2 of the ninth patterned conductor 311d. A total width of the tenth patterned conductor 312c and the eleventh patterned conductor 313c is equivalent to the distance between an end T3 of the eleventh patterned conductor 313c and an opposite end T4 of the tenth patterned conductor 312c.

The interval between the power supply terminal joints 31b and the motor terminal joints 31c lies within a range defined by a straight line L1 extending through the end T1 of the first patterned conductor 311a and the end T3 of the eleventh patterned conductor 313c and a straight line L2 extending through end T2 of the ninth patterned conductor 311d and the end T4 of the tenth patterned conductor 312c. This permits all joints of the four switching transistors 32, the relays 34 and 35, the capacitor 36, the shunt resistor 37, and the coil 38 to the control substrate 31 to be located within that range, thus minimizing the path of current flowing from the first input terminal 31ba to the second input terminal 31bb.

The power supply terminal joints 31b are provided on an end of the control substrate 31. The motor terminal joints 31c are provided on the other end of the control substrate 31. The four switching transistors 32, the relays 34 and 35, the capacitor 36, the shunt resistor 37, and the coil 38 are mounted between the power supply terminal joints 31b and the motor terminal joints 31c, so that the current flows from the power supply connector 15 to the first input terminal 31ba, to the relay 34, to the coil 38, to the upper switching transistors 32, and to the first output terminal 31ca. The current then passes through the electric motor 4 and flows to the second output terminal 31cb, to the lower switching transistors 32, to the shunt resistor 37, and back to the second input terminal 31bb. It is, thus, possible to have each of the circuit line connecting between the first input terminal 31ba and the first output terminal 31ca and the circuit line connecting between the second output terminal 31cb and the second input terminal 31bb extend only in one direction without turns. This minimizes the length of the circuit lines, thus resulting in a decrease in quantity of heat produced from the first to eleventh patterned conductors 311a to 313c.

The first input terminal 31ba is located close to the second input terminal 31bb. Similarly, the first output terminal 31ca is located close to the second output terminal 31cb. This minimizes the total width of the first patterned conductor 311a and the ninth patterned conductor 311d and the total width of the tenth patterned conductor 312c and the eleventh patterned conductor 313c, thereby decreasing the path of current circulating from the first input terminal 31ba to the second input terminal 31bb.

The current from the power supply connector 15 has been described above as flowing from the first input terminal 31ba to the first output terminal 31ca and then from the second output terminal 31cb to the second input terminal 31bb, but it flows from the first input terminal 31ba to the second output terminal 31cb and then from the first output terminal 31ca to the second input terminal 31bb when the torque applied to the steering shaft is reversed in direction.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. An electric power steering device comprising:
   an electric motor which is driven by supply of current;
   a controller including a substrate on which drive devices working to drive said electric motor are connected electrically, the drive devices including a first drive device connected electrically between a power supply and said electric motor and a second drive device connected electrically between said electric motor and ground;

power supply terminal joints which are provided on the substrate of said controller for receiving the current to be supplied to said electric motor, said power supply terminal joints including a first input terminal leading electrically to a power supply and a second input terminal connected electrically to ground; and motor terminal joints which are provided on the substrate of said controller, said motor terminal joints including a first output terminal leading to the first input terminal and a second output terminal leading to the second input terminal for outputting the current to said electric motor, wherein said first and second drive devices are mounted between said power supply terminal joints and said motor terminal joints, wherein said drive devices work to control a duty cycle of the current supplied to said electric motor, said drive devices including first switching transistors connected electrically to the power supply and second switching transistors connected electrically to ground, and wherein joints of the first and second switching transistors to the control substrate of said controller are all disposed between said power supply terminal joints and said motor terminal joints.

2. An electric power steering device as set forth in claim 1, wherein said power supply terminal joints are provided on a first end portion of the substrate of said controller, while said motor terminal joints are provided on a second end portion of the substrate opposite the first end portion.

3. An electric power steering device as set forth in claim 1, wherein said electric motor works to produce torque assisting in turning a steering shaft of an automotive vehicle, wherein said controller includes a control device working to control the current flowing through said electric motor, wherein said first and second drive devices, said power supply terminal joints, and said motor terminal joints are disposed on a first side portion of the substrate of said controller, and said control device is installed on a second side portion of the substrate, and wherein the substrate of said controller has a hole formed in the second side portion through which the steering shaft passes which connects with a steering wheel.

4. An electric power steering device comprising:
an electric motor which is driven by supply of current;
a controller including a substrate on which drive devices working to drive said electric motor are connected electrically, the drive devices including a first drive device connected electrically between a power supply and said electric motor and a second drive device connected electrically between said electric motor and ground;

power supply terminal joints which are provided on the substrate of said controller for receiving the current to be supplied to said electric motor, said power supply terminal joints including a first input terminal leading electrically to a power supply and a second input terminal connected electrically to ground; and motor terminal joints which are provided on the substrate of said controller, said motor terminal joints including a first output terminal leading to the first input terminal and a second output terminal leading to the second input terminal for outputting the current to said electric motor, wherein said first and second drive devices are mounted between said power supply terminal joints and said motor terminal joints, wherein said first input terminal is installed close to said second input terminal, and said second output terminal is installed close to said second output terminal, wherein the substrate of said controller has formed thereon a printed circuit which includes a first conductor coupled directly to said first input terminal, a second conductor coupled directly to said second input terminal, a third conductor coupled directly to said first output terminal, and a fourth conductor coupled directly to said second output terminal, and wherein an interval between said power supply terminal joints and said motor terminal joints lies within a range defined by a first straight line extending through outer edges of said first and third conductors and a second straight line extending through outer edges of said second and fourth conductors.

5. An electric power steering device as set forth in claim 4, wherein said power supply terminal joints are provided on a first end portion of the substrate of said controller, while said motor terminal joints are provided on a second end portion of the substrate opposite the first end portion.

6. An electric power steering device as set forth in claim 4, wherein said electric motor works to produce torque assisting in turning a steering shaft of an automotive vehicle, wherein said controller includes a control device working to control the current flowing through said electric motor, wherein said first and second drive devices, said power supply terminal joints, and said motor terminal joints are disposed on a first side portion of the substrate of said controller, and said control device is installed on a second side portion of the substrate, and wherein the substrate of said controller has a hole formed in the second side portion through which the steering shaft passes which connects with a steering wheel.

* * * * *